US009306723B2

(12) United States Patent
Nory et al.

(10) Patent No.: US 9,306,723 B2
(45) Date of Patent: Apr. 5, 2016

(54) MULTI-CARRIER CONTROL SIGNALING IN WIRELESS COMMUNICATION SYSTEM (75) Inventors: Ravikiran Nory, Buffalo Grove, IL (US); Ravi Kuchibhotla, Gurnee, IL (US); Robert T. Love, Barrington, IL (US); Vijay Nangia, Algonquin, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 893 days.

(21) Appl. No.: 12/709,476

(22) Filed: Feb. 20, 2010

(65) Prior Publication Data

US 2011/0205978 A1 Aug. 25, 2011

(51) Int. Cl.
H04W 72/04 (2009.01)
H04L 5/00 (2006.01)
(52) U.S. Cl.
CPC .............. *H04L 5/0096* (2013.01); *H04L 5/001* (2013.01); *H04L 5/0007* (2013.01); *H04L 5/0098* (2013.01)
(58) Field of Classification Search
CPC ... H04W 72/04; H04L 5/0098; H04L 5/0096; H04L 5/0007; H04L 5/001
USPC ................................... 370/252; 455/509, 434
See application file for complete search history.

(56) References Cited

U.S. PATENT DOCUMENTS

| 8,238,818 | B2 | 8/2012 | Karabinis et al. |
| 8,401,542 | B2 | 3/2013 | Chung et al. |
| 8,934,417 | B2 | 1/2015 | Nory et al. |
| 2006/0274712 | A1 | 12/2006 | Malladi et al. |
| 2008/0310359 | A1 | 12/2008 | McBeath et al. |
| 2010/0091678 | A1 | 4/2010 | Chen et al. |
| 2010/0142455 | A1 | 6/2010 | Imamura |
| 2010/0227569 | A1 | 9/2010 | Bala et al. |
| 2010/0254329 | A1 | 10/2010 | Pan et al. |
| 2010/0279628 | A1 | 11/2010 | Love et al. |
| 2011/0194501 | A1 | 8/2011 | Chung et al. |
| 2011/0201333 | A1* | 8/2011 | Kwon et al. .................. 455/434 |
| 2011/0267978 | A1 | 11/2011 | Etemad |
| 2012/0009923 | A1 | 1/2012 | Chen et al. |

(Continued)

FOREIGN PATENT DOCUMENTS

CN 101099035 A 2/2008
EP 1944896 A1 7/2008

(Continued)

OTHER PUBLICATIONS

United States Patent & Trademark Office "Non-Final Office Action" for U.S. Appl. No. 12/405,406 dated Sep. 14, 2012, 19 pages.

(Continued)

*Primary Examiner* — Mark Rinehart
*Assistant Examiner* — Gbemileke Onamuti
(74) *Attorney, Agent, or Firm* — Faegre Baker Daniels LLP (57) ABSTRACT A method in a wireless communication terminal including monitoring a terminal specific search space of a first Component Carrier (CC) from a base unit, wherein the search space corresponds to a set of Physical Downlink Control CHannel (PDCCH) candidates monitored by the terminal for PDCCH messages, and receiving an activation message on the first CC, wherein the activation message activates at least one additional CC. The size of the search space monitored by the terminal after receiving the activation message is greater than the size of the search space monitored before receiving the activation message.

10 Claims, 4 Drawing Sheets (56) References Cited

U.S. PATENT DOCUMENTS

| | | | |
|---|---|---|---|
| 2012/0208583 A1* | 8/2012 | Chung et al. | 455/509 |
| 2013/0010619 A1* | 1/2013 | Fong et al. | 370/252 |

FOREIGN PATENT DOCUMENTS

| | | | |
|---|---|---|---|
| KR | 10-2009-0033001 A | 4/2009 | |
| KR | 1020090033001 A | 4/2009 | |
| WO | 2008083804 A2 | 7/2008 | |
| WO | 2008157692 A2 | 12/2008 | |
| WO | 2010129400 A1 | 11/2010 | |
| WO | 2011102686 A2 | 8/2011 | |

OTHER PUBLICATIONS

3GPP TSG RAN WG1 Meeting #58; "Carrier Indication for Carrier Aggregation"; Shenzhen, China, Aug. 24-Aug. 28, 2009; R1-093296; 4 pages.
3GPP TSG RAN WG1 Meeting #59bis; "Further Discussion on PDCCH with Cross Carrier Operation"; Valencia, Spain, Jan. 18-22, 2010; R1-100361; 6 pages.
Motorola, "PDCCH Search Space Assignment Hashing Function", 3GPP TSG RAN1 #52bis R1-081672, Mar. 31-Apr. 4, 2008, pp. 1-7, vol. 6.1.3, Shenzhen, China.
Motorola, "PDCCH Search Space Assignment Hashing Function", 3GPP TSG RAN1 #52bis, R1-081289, Mar. 31-Apr. 4, 2008, pp. 1-4, vol. 61.3, Shenzhen, China.
Motorola, "PDCCH Search Space Assignment Hashing Function", 3GPP TSG RAN1 #52bis, R1-081586, Mar. 31-Apr. 4, 2008, pp. 1-6, vol. 6.1.3, Shenzhen, China.
Motorola, "E-UTRA DL L1/L2 Control Channel Design", 3GPP TSG RAN1 #48; St. Louis, USA; Feb. 12-16, 2007; R1-070787.
Motorola, "Search Space Definition for L1/L2 Control Channels", 3GPP TSG RAN1 #50; Athens, Greece; Aug. 20-24, 2007; R1-073373.
Ericsson, Qualcomm, Nokia, TI, NTT DOCOMO, Motorola, Panasonic, Siemens, Samsung, Nortel, ZTE, LGE Huawei, Alcatel-Lucent, Freescale, "Way Forward on Downlink Control Signaling", Agenda Item 6.9.2; Feb. 14, 2007; R1-071223.
Motorola U.S. Appl. No. 12/405,046, filed Mar. 16, 2009.
TSG-RAN WG1 #53bis; Warsaw, Poland, Jun. 30-Jul. 4, 2008; Carrier Aggregation in LTE-Advanced; Ericsson R1-082468.
R1-082380; Jul. 2008; Technical Scope for LTE-Advanced Evolution; ZTE Corporation.
3GPP TSG RAN WG1 Meeting #54bis; Prague, Czech Republic, Sep. 29-Oct. 3, 2008; DL Layered Control Signal Structure in LTE-Advanced; R1-083681.
3GPP TS 36.212 V8.5.0 (Dec. 2008) 3rd Generation Partnership Project; Technical Specification Group Radio Access Network; Evolved Universal Terrestrial Radio Access (E-UTRA); Multiplexing and Channel Coding (Release 8); Section 5.3.3.1.
3GPP TS36.213 V8.5.0 (Dec. 2008) 3rd Generation Partnership Project; Technical Specification Group Radio Access Network; Evolved Universal Terrestrial Radio Access (E-UTRA); Physical Layer Procedures (Release 8); Section 6.2.
Hashing Functions Performance in Packet Classification; Mahmood Ahmadi and Stephan Wong; Computer Engineering Laboratory; Faculty of Electrical Engineering, Mathematics and Computer Science; Delft University of Technology.
Motorola U.S. Appl. No. 12/435,145, filed May 4, 2009.
Panasonic: "Further discussion on PDCCH with cross carrier operation", 3GPP TSG-RAN WG1 Meeting #59bis, Valencia, Spain, Jan. 18-22, 2010, R1-100361, all pages.
Patent Cooperation Treaty, "PCT Search Report and Written Opinion of the International Searching Authority" for International Application No. PCT/US2011/025155 Aug. 1, 2011, 11 pages.
3GPP TSG RAN WG1 #59, R1-094829 "PDCCH Monitoring lor LTE-A" Motorola, Jeju, Korea, Nov. 9-13, 2009, 4 pages.

3GPP TSG RAN2 #67bis, R2-095576 "Component Carrier Configuration/Activation for Carrier Aggregation" NEC, Miyazaki, Japan, Oct. 12-16, 2009, 4 pages.
3GPP TSG RAN WG2 #68, R2-096752 "Activation and Deactivation of Component Carriers" Ericsson, ST-Ericsson, Jeju, Korea, Oct. 9-13, 2009, 4 pages.
3GPP TSG RAN WG1 #59, R1-094830 "PDCCH Design for Cross-Carrier Operation Using CIF" Motorola, Jeju, Korea, Nov. 9-13, 2009, 4 pages.
3GPP TSG RAN WG1 #69, R2-101537 "UE Assignment Methods During CIF Configuraiton" NTT DOCOMO, Inc., San Francisco, USA Feb. 22-26, 2010, 3 pages.
3GPP TSG RAN WG1 #69, R2-101534 "DL and UL CC Linkage for Carrier Aggregation" NTT DOCOMO, Inc., San Francisco, USA Feb. 22-26, 2010, 6 pages.
United States Patent & Trademark Office "Non-Final Office Action" for U.S. Appl. No. 12/405,406 dated Sep. 29, 2011, 19 pages.
Patent Cooperation Treaty, "PCT Search Report and Written Opinion of the International Searching Authority" for International Application No. PCT/US2010/026500 Dec. 16, 2010, 11 pages.
Patent Cooperation Treaty, "PCT Search Report and Written Opinion of the International Searching Authority" for International Application No. PCT/US2010/033079 Aug. 26, 2010, 15 pages.
"PDCCH blind decoding—Outcome of offline discussions" Ericsson Feb. 11, 2008, R1-081101, 8 pages.
3GPP TSG RAN WG1 Meeting #52bis, Shenzhen, China, Mar. 31-Apr. 4, 2008, "Analysis of search space design for PDCCH blind decoding" Philips, Tdoc R1-081504, 6 pages.
3GPP TSG RAN1 #51bis, Sevilla, Spain, Jan. 14-18, 2008 "Search Space Definition: Reduced PDCCH Blind Detection for Split PDCCH Search Space" Motorola, R1-080079, 4 pages.
Japanese Patent Office "Office Action" for Japanese Patent Application No. 2012-508761 dated Feb. 12, 2013, 2 pages.
3GPP TSG RAN WG1 #52bis, R1-081212 "UE-specific search space" Samsung; Shenzhen, China; Mar. 31-Apr. 4, 2008; 7 pages.
Korean Intellectual Property Office, "KIPO's Notice of Preliminary Rejection", Korean Pat. Appln. No. 10-2011-7026269, Apr. 2, 2013.
3GPP TSG RAN WG1 #56bis, R1-091168 "PDCCH coding and mapping for carrier aggregation" Panasonic; Seoul, Korea; Mar. 23-27, 2009, 5 pages.
United States Patent & Trademark Office "Non-Final Office Action" for U.S. Appl. No. 12/405,406 dated Sep. 27, 2013, 22 pages.
3GPP TSG-RAN1 #56bis, R1-091503 "Anchor component carrier and preferred control signal structure" Fujitsu, Seoul, ROK; Jan. 23-27, 2009, 5 pages.
State Intellectual Property of the People's Republic of China, First Office Action for Chinese Patent Application No. 201080019633.7 (related to above-captioned patent application), mailed Dec. 25, 2013.
State Intellectual Property of the People's Republic of China, Second Office Action for Chinese Patent Application No. 201080011310.3 (related to above-captioned patent application), mailed Jun. 5, 2014.
State Intellectual Property of the People's Republic of China, Second Office Action for Chinese Patent Application No. 201080019633.7 (related to above-captioned patent application), mailed Jul. 22, 2014.
State Intellectual Property of the People's Republic of China, Third Office Action for Chinese Patent Application No. 201080011310.3 (related to above-captioned patent application), mailed Dec. 8, 2014.
State Intellectual Property of the People's Republic of China, First Office Action for Chinese Patent Application No. 201080011310.3 (related to above-captioned patent application), mailed Jul. 23, 2013.
United States Patent and Trademark Office, Notice of Allowance for U.S. Appl. No. 12/405,046 (related to above-captioned patent application), mailed Jun. 2, 2014.
United States Patent and Trademark Office, Non-Final Rejection for U.S. Appl. No. 12/435,145 (related to above-captioned patent application), mailed Jul. 22, 2011.
United States Patent and Trademark Office, Final Rejection for U.S. Appl. No. 12/435,145 (related to above-captioned patent application), mailed Nov. 17, 2011.
United States Patent and Trademark Office, Decision on Appeal for U.S. Appl. No. 12/435,145 (related to above-captioned patent application), mailed Nov. 5, 2014.

(56) References Cited

OTHER PUBLICATIONS

United States Patent and Trademark Office, Non-Final Rejection for U.S. Appl. No. 12/435,145 (related to above-captioned patent application), mailed Feb. 5, 2015.
United States Patent and Trademark Office, Final Rejection for U.S. Appl. No. 12/435,145 (related to above-captioned patent application), mailed Jun. 4, 2015.
European Patent Office, Office Action for European Patent Application No. 10709613.3 (related to above-captioned patent application), mailed Jun. 28, 2012.
European Patent Office, Office Action for European Patent Application No. 10709613.3 (related to above-captioned patent application), mailed Feb. 19, 2015.
Federal Service for Intellectual Property, Official Action for Russian Patent Application No. 2011149338/07(074025) (related to above-captioned patent application), mailed Apr. 1, 2014.
Korean Intellectual Property Office, Notice of Preliminary Rejection for Korean Patent Application No. 10-2013-7032357 (related to above-captioned patent application), mailed Apr. 7, 2014.
Korean Intellectual Property Office, Notice of Final Rejection for Korean Patent Application No. 10-2009-0033001 (related to above-captioned patent application), mailed Sep. 4, 2013.
3GPP TSG RAN WG1, #51bis, "Reducing the Decoding Complexity of the PDCCH," R1-080303, Jan. 14-18, 2008.
Instituto Mexicano de la Propiedad Industrial, "Rejection," Mexican Patent Application No. MX/a/2011/011462, Jan. 17, 2013 (including email with English summary of rejections).

* cited by examiner

MULTI-CARRIER CONTROL SIGNALING IN WIRELESS COMMUNICATION SYSTEM

FIELD OF THE DISCLOSURE

The present disclosure relates generally to wireless communications and, more particularly, to multi-carrier control signaling between a base unit and a mobile unit.

BACKGROUND

In the currently envisaged 3GPP LTE Rel-10 or LTE Advanced (LTE-A) multi-carrier system, carrier or spectrum aggregation (CA), where two or more Component Carriers (CCs) are aggregated, is used in order to support wider transmission bandwidths. The CC aggregated can be contiguous or noncontiguous in the same frequency band (Intra-band CA) or be in non-contiguous frequency bands. A LTE-A User Equipment (UE) can receive and transmit control and data signaling on multiple CCs. In order to enable the UE to communicate with the network on multiple CCs with reduced latency and power consumption, the network follows a multi-step process where the UE may be pre-configured for possible reception and/or transmission on multiple CCs using a long term configuration message and possibly a subset of those CCs are dynamically activated for short time periods to enable the UE to receive and/or transmit large data bursts with subsequent de-activated of the subset of the CCs when not needed.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
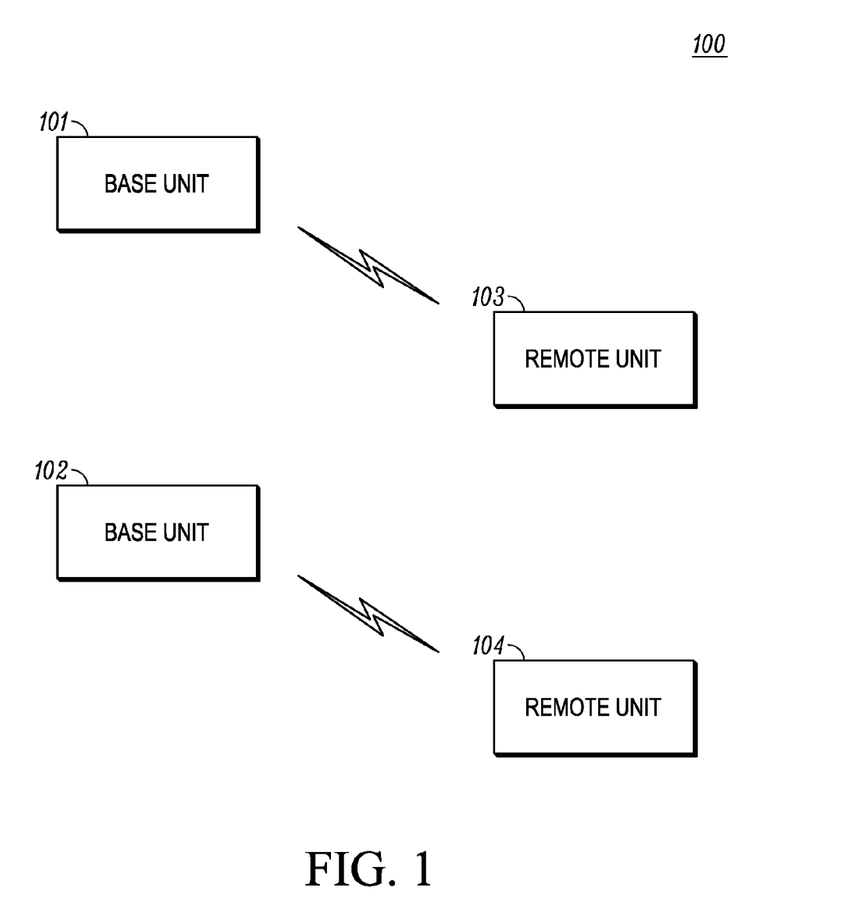
FIG. 1 is a wireless communication system.

In FIG. 1, a wireless communication system 100 comprises one or more fixed base infrastructure units 101, 102 forming a network distributed over a geographical region for serving remote units in the time and/or frequency and/or spatial domain. A base unit may also be referred to as an access point, access terminal, base, base station, NodeB, enhanced NodeB (eNodeB), Home NodeB (HNB), Home eNodeB (HeNB), Macro eNodeB (MeNB), Donor eNodeB (DeNB), relay node (RN), femtocell, femto-node, network node or by other terminology used in the art. The one or more base units each comprise one or more transmitters for downlink transmissions and one or more receivers for uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units 103, 104 within a corresponding serving area, for example, a cell or a cell sector, via a wireless communication link. The remote units may be fixed or mobile. The remote units may also be referred to as subscriber units, mobiles, mobile stations, mobile units, users, terminals, subscriber stations, user equipment (UE), user terminals, wireless communication devices, relay node, or by other terminology used in the art. The remote units also comprise one or more transmitters and one or more receivers. In FIG. 1, the base unit 101 transmits downlink communication signals to serve remote unit 103 in the time and/or frequency and/or spatial domain. The remote unit 104 communicates with base unit 102 via uplink communication signals. Sometimes the base unit is referred to as a serving or connected or anchor cell for the remote unit. The remote units may also communicate with the base unit via a relay node.

In one implementation, the wireless communication system is compliant with the 3GPP Universal Mobile Telecommunications System (UMTS) LTE protocol, also referred to as EUTRA or 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. The instant disclosure is particularly relevant to 3GPP LTE Release 8 (Rel-8) and LTE Release 10 (Rel-10), but may also be applicable to other wireless communication systems. More generally the wireless communication system may implement some other open or proprietary communication protocol, for example, IEEE 802.16(d) (WiMAX), IEEE 802.16(e) (mobile WiMAX), among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a Time Division Duplex (TDD) or Frequency Division Duplex (FDD) system.

A LTE-A User Equipment (UE) can receive and transmit control and data signaling on multiple component carriers (CCs). Initially, the UE is expected to communicate with the network by receiving only a single CC (Primary or Anchor CC). In a first step, the network sends a configuration message (SI configuration message) to the UE on the primary CC with system information (SI) corresponding to other CCs on which the network may schedule the UE. The SI typically consists of CC specific information that the UE is required to store in order to communicate with the network on other CCs. The SI can include CC specific information such as CC carrier frequency, downlink (DL) bandwidth, number of antennas, downlink reference signal power, uplink (UL) power control parameters and other information that does not change frequently. As the SI does not change frequently and the payload associated with the SI configuration is relatively large, the SI configuration message is sent to the UE using Radio Resource Configuration (RRC) signaling from an eNodeB in the network. RRC signaling between the UE and eNodeB is typically associated with large latency, e.g., 10-15 ms. Upon receipt of the SI configuration RRC message, the UE stores the SI for other CCs but continues to communicate with the network by only receiving the primary CC. The other CCs for which the UE has received SI and the primary CC constitute the UE's "configured CC set".

In a second step, the eNodeB sends an activation message to the UE instructing the UE to communicate (receive and/or transmit) on other CCs in addition to the primary CC. Upon reception of the activation message, the UE activates the other CCs and can receive control and data signaling on the activated CCs (including the primary CC). In order to receive multiple CCs, the UE must reconfigure its hardware to receive a larger bandwidth. However, receiving more bandwidth increases UE power consumption. Thus, in the preferred embodiment, the eNodeB sends the activation message only when the bandwidth of the primary CC is not sufficient to schedule a large data burst to the UE. In another embodiment, the eNodeB may send the activation message to enable load balancing in the network and not necessarily schedule a large data burst to the UE. Once the UE has received the large data burst, the eNodeB may send a de-activation message to the UE instructing the UE to reconfigure its receiver for a smaller bandwidth to receive only the primary CC. The activation/deactivation messages are sent from the network or eNodeB using Layer 1 (L1) or Medium Access Control (MAC) signaling. L1 or MAC signaling between the UE and eNodeB is typically associated with low latency, e.g., 1-4 ms. Further, the deactivation message can be implicit or explicit.

Since the UE has already stored the SI corresponding to the configured CCs in the first step, the UE can quickly communicate with the network on multiple activated CCs when they are activated by the eNodeB. This reduces latency. As multiple CCs are activated only during occasional reception of large data bursts, the UE is required to receive large bandwidths only occasionally. This reduces UE power consumption.

Figure 2:
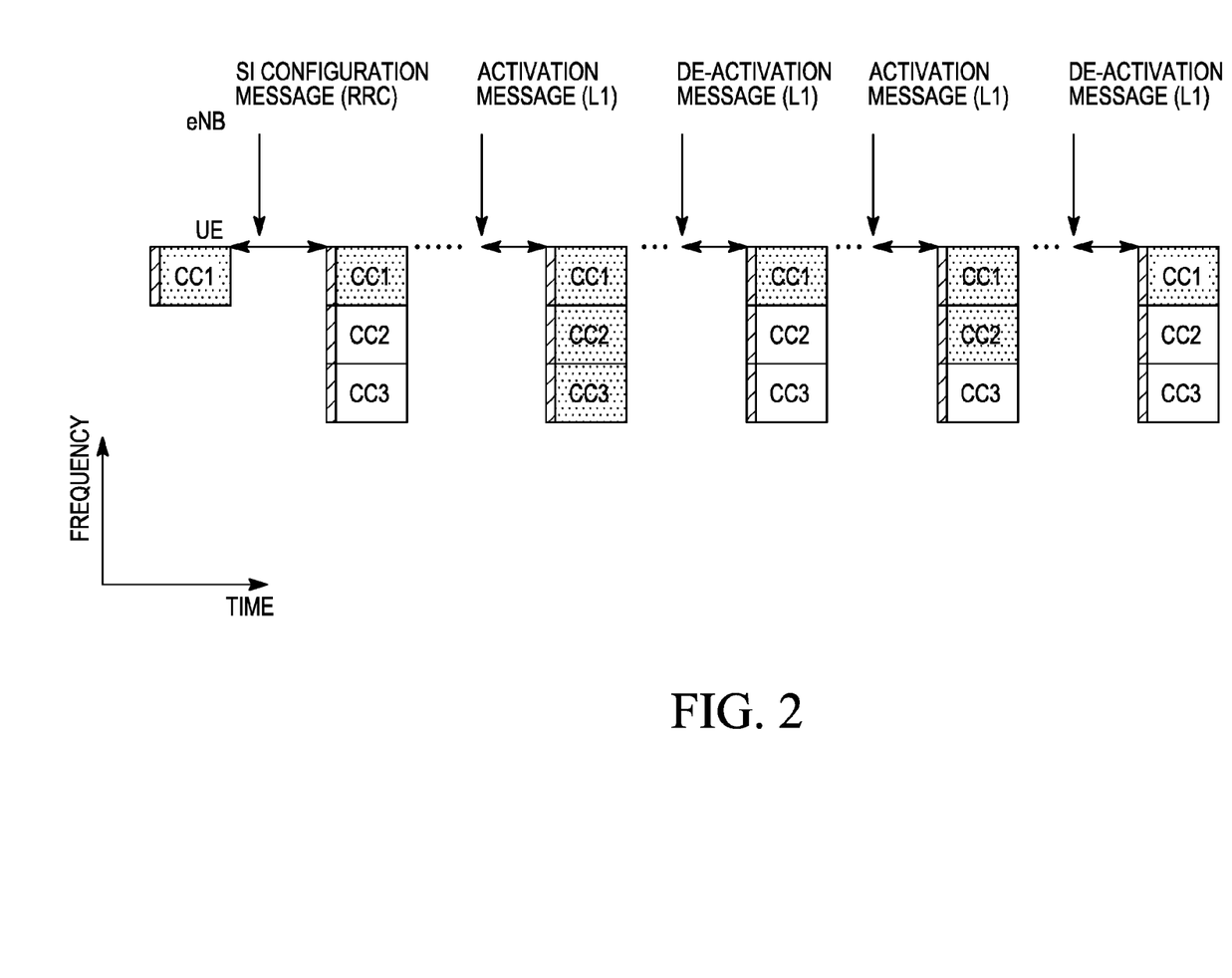
FIG. 2 illustrates a process enabling a UE to communicate on multiple component carriers.

FIG. 2 illustrates an example of the process of configuration, activation and deactivation of CCs. As shown, the UE first communicates with the network only using a single CC (CC1). Upon reception of the SI configuration message on CC1, the UE stores information about CC2 and CC3 but continues to communicate with the network using CC1. At this stage, CC1, CC2 and CC3 constitute the UE's "configured CC set". At a future time, the UE receives an activation message from the eNodeB indicating that CC2 and CC3 are activated. The eNodeB might have activated these CCs to quickly schedule a large data burst to the UE. Once the data burst reception is completed, CC2 and CC3 are deactivated using an explicit deactivation message as illustrated in this example. In an alternate embodiment, the deactivation may be implicit or using some other mechanism. The UE continues to communicate with the eNodeB using only CC1 thereafter until the UE receives a new activation message. In an alternative embodiment, the deactivation message may deactivate CC1 and CC3 and thus the UE continues to communicate with the eNodeB using CC2 thereafter until the UE receives a new activation message. The CC2 may then take the role of the primary or anchor carrier.

CC1, CC2 and CC3 can have same or different carrier bandwidths. For example, CC1 can have a bandwidth 10 MHz, CC2 and CC3 can have a bandwidth of 5 MHz. UE capable of communicating with the eNodeB over multiple CCs are typically advanced UE associated with LTE Rel-10 or a future release. In most cases the eNodeB can communicate with both LTE Rel-10 UE and LTE Rel-8 UE (legacy UE) on the same CC. In such cases the CC should support all the necessary backwards compatible signaling required for LTE Rel-8 such as transmission of synchronization channels, system information broadcast, pilot transmissions for serving legacy UEs. In most implementations the UE is expected to receive all the CCs (i.e., CC1, CC2 and CC3 in FIG. 2) from the same eNodeB. In some specific implementations it may be possible for the UE to receive some CCs from one eNodeB and some other CCs from another eNodeB.

When the eNodeB communicates to the UE on multiple activated CCs, the eNodeB can send data and control signaling to the UE on each activated CC. Control signaling is preferably sent to the UE in a control region in the first few symbols of each subframe in each activated CC. Data is sent in a data region in the remaining symbols of each subframe in each activated CC. Scheduling messages in the control region of each activated CC are sent on a Physical Downlink Control CHannel (PDCCH). Data is received by the UE in the data region of each activated CC on a Physical Downlink Shared CHannel (PDSCH) corresponding to that CC. On the uplink, data is transmitted by the UE on a Physical Uplink Shared CHannel (PUSCH) on one or more of the multiple activated CCs or the CCs in the UE configured set.

In certain heterogeneous network deployments, interference from other eNodeB transmissions is not uniform across all CCs. This results in significantly different signal reception quality at the UE on each activated CC. Since control signaling is considered more critical than data signaling, the eNodeB can use PDDCH messages in the control region of one CC, typically the CC with better signal quality (e.g., the Primary CC) to schedule PDSCH data for multiple activated CCs. This procedure is called cross-carrier scheduling. Cross-carrier scheduling may also be used for other purposes such as network load balancing.

PDCCH messages contain Downlink Control Information (DCI). DCI includes scheduling information. Scheduling information includes signaling such as a set of PDSCH/PUSCH Resource blocks (RBs) on which the UE is scheduled data, Modulation and Coding Scheme (MCS) of scheduled data, Hybrid ARQ (HARQ) process number and Redundancy Version (RV) of scheduled data etc. Depending on the type of data scheduled, various DCI format types such as DCI format 1A, 1B, 1C, 1D, 2, 2A, 3, 3A are used. PDCCH messages with different DCI format types can have same or different size. PDCCH messages are also used for scheduling uplink transmissions from the UE on Physical Uplink Shared CHannel (PUSCH) resources of different activated CCs. DCI format 0 is used for scheduling PUSCH.

The control region in a given subframe comprises time-frequency resources called Control Channel Elements (CCEs). Each CCE comprises several smaller time frequency resources called Resource Element Groups (REGs). For example, in LTE Rel-8, each CCE comprises 9 REGs. A REG consists several even smaller time-frequency resources called Resource Elements (REs). For example, in LTE Rel-8, each REG can have 4 or 6 REs. A REG may have REs that are mapped to only control channels or REs that are mapped to both control channels and reference signals.

A UE monitors a set of PDCCH candidates for control information in the control region of every non-DRX subframe, where monitoring implies attempting to decode each of the PDCCHs in the set according to several DCI format types and DCI format sizes. The set of PDCCH candidates to monitor are defined in terms of search spaces. Thus, a search space corresponds to a set of PDCCH candidates monitored by the UE for PDCCH messages. The CCEs corresponding to a particular PDCCH candidate of a search space are determined at the UE by using a predefined formula. A UE can monitor multiple search spaces. The search spaces may overlap. A search space is further defined by various aggregation levels. An aggregation level corresponds to an aggregation of one or several consecutive logically indexed CCEs. CCEs available in the control region of a subframe are logically indexed from 0 to a maximum value. The aggregation levels defining each of the search spaces and number of PDCCH candidates associated with each aggregation level in a search space are determined by the UE using predefined rules or tables. The DCI format types and DCI format sizes that the UE monitors on each search space can depend on UE configuration.

The concept of monitoring a set of PDCCH candidates in terms of search spaces allows the UE receive PDCCH messages of various DCI format types and sizes with a reasonable amount of decoding complexity. For example, a typical control region of a particular subframe of a particular CC can contain up to approximately 80 CCEs. A PDDCH message of a given DCI format can be signaled by the eNodeB using an aggregation of 1, 2, 4 or 8 logically consecutive CCEs. Without the concept of a search space, the UE must blindly decode all possible CCEs combinations within the control region at various aggregation levels to receive the PDCCH message which results in extremely high decoding complexity. The concept of search spaces allows the UE to decode a relatively small subset of CCE combinations within the control region to receive PDCCH messages.

For example, in LTE Rel-8, a UE monitors the control region of every non Discontinous Reception (DRX) subframe for PDCCH messages in common search spaces and UE specific search spaces at different aggregation levels. The CCEs corresponding to each search space $S_k^{(L)}$ are determined by the UE using a predefined formula $L \cdot \{(Y_k+m) \bmod \lfloor N_{CCE,k}/L \rfloor\} + i$ for all allowed values of i and m, where $N_{CCE,k}$ is the total number of CCEs in the control region of a given subframe k, i=0, . . . , L−1 for a given allowed aggregation level (L), m=0, . . . , $M^{(L)}$−1 for a given allowed number of PDCCH candidates that have to be monitored ($M^{(L)}$), and $Y_k$ is an initialization parameter set to either zero or a UE specific value.

The allowed aggregation levels and number of PDCCH candidates monitored for each search space are pre-specified and listed in a Table as shown below [3GPP TS 36.213 Table 9.1.1-1].

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The UE monitors the PDCCH candidates of each search space for PDCCH messages of different DCI format types and DCI format sizes depending on UE configuration. Table 2 below gives an example listing of some DCI format types and sizes allowed for LTE Rel-8 for a 20 MHz system bandwidth and FDD operation.

TABLE 2

| DCI Format Type | DCI Format Size |
|---|---|
| 0 | 44 |
| 1A | 44 |
| 1C | 31 |
| 1 | 55 |
| 2 | 70 |
| 3 | 44 |
| 3A | 44 |

The UE performs a separate decode operation for each distinct DCI format size for all PDCCH candidates that correspond to the search space where a particular DCI format type is expected. In the common search spaces (CSS) of aggregation levels 4 and 8, the UE looks for DCI format types 0, 1A, 3, 3A and 1C. Since 0, 1A, 3, 3A have the same size, the UE performs only a single set of decode operations corresponding to the 4+2=6 allowed PDCCH candidates. Since DCI Type 1C has a different size, the UE performs an additional 6 blind decodes resulting in a total of 12 decode operations for CSS. The common search spaces are associated with a $Y_k$ value of zero.

In the UE specific search spaces (UESS), of aggregation levels 1, 2, 4 and 8 the UE looks for DCI format type 0, 1A and one additional DCI format type (i.e., one chosen from types 1, 2, 1B, 2A, 2B) depending on UE configuration. The one additional DCI format type has a size larger than 44 bits. Given this, in the UESS, the UE performs a total of (6+6+2+2)*2=32 decode operations. Therefore, a LTE Rel-8 UE performs 12+32=44 decode operations to receive PDCCH messages in each subframe whose control region is monitored. The UE specific search spaces are associated with a UE specific $Y_k$ value.

In a LTE Rel-10 system, when a UE is configured for cross-carrier scheduling, the eNodeB sends a cross scheduling configuration (CSC) message to the UE indicating that the UE should receive, or is expected to receive, PDCCH messages including a Carrier Indication Field (CIF) in the DCI of the PDCCH messages. The CIF signals whether each received PDCCH message corresponds to a first CC or at least one additional CC. Including the CIF increases the size of the PDCCH messages. For example, including a 3 bit CIF field increases the size of a DCI format 1 PDCCH message from 55 bits to 55+3=58 bits.

The CIF field signals a preconfigured index of the CC on which PDSCH/PUSCH data resources are scheduled. The index values corresponding to different CCs can be configured by the eNodeB using either the SI configuration message or the CSC message described earlier. Alternatively, a separate configuration message or the activation message can be used.

A LTE Rel-10 UE is expected to receive several separate PDDCH messages in the control region of a subframe in a CC for which CIF is configured. Each PDCCH message corresponds to a PDSCH resource assignment for a particular CC. Typically a UE is not expected to receive more than one PDSCH resource assignment per CC.

The eNodeB can configure the UE to include CIF on a subset of CCs. The subset of CCs that contain CIF can be signaled to the UE in the SI configuration RRC message, cross scheduling configuration (CSC) message or some other message. In the CCs configured with CIF, the UE is expected to receive some PDCCH messages whose DCI does not include CIF (e.g., messages signaling broadcast information) and some PDCCHs whose DCI includes CIF. In one implementation, PDCCH messages received in CSS do not contain a CIF. PDCCH messages received in the UESS contain CIF.

In LTE Rel-10, since the UE is expected to receive PDCCH messages corresponding to multiple CCs in a single control region, the search spaces for receiving PDCCH messages with CIF have to be expanded beyond the Rel-8 search spaces. For example, a UE using a Rel-8 UESS design would monitor only two PDCCH candidates of a UESS at aggregation level 8. This may be sufficient for the case of non cross-carrier scheduling where the UE is expected to receive a maximum 1UL grant and 1DL assignment in its UESS. However, with cross carrier scheduling, the UE can be scheduled n UL grants and n DL assignments in the control region of a single CC that cross schedules n−1 other CCs. In such a scenario, the eNodeB will be forced to use a smaller aggregation level to cross schedule other CCs. Signaling at smaller aggregation levels is less reliable than aggregation level 8. Such restrictions on an eNodeB scheduler are not desirable as they may degrade overall system performance.

To maintain a similar level of scheduler flexibility as that of Rel-8, the control region of a CC that cross schedules n−1 other CCs should have search spaces whose size is larger than the size of LTE Rel-8 UESS. One implementation can increase the search space size (by increasing the number of PDCCH candidates) for all the allowed aggregation levels 1, 2, 4 and 8. Another implementation can only increase the search space size for some aggregation levels (e.g., levels 4 and 8) and leave the search space size same as that of LTE Rel-8 UESS for some other aggregation levels. Such an implementation allows slightly reduced complexity UE implementation compared to previous implementation (number of decodes performed at the UE is proportional to search space size) while providing some level of flexibility at the eNodeB. U.S. Publication No. 2010/0279628 corresponding to U.S. application Ser. No. 12/435,145 entitled "Control Channel Provisioning and Signaling" describes increasing the search space size for some aggregation levels. Yet another implementation can increase the search space size beyond LTE Rel-8 by adding new aggregation levels (e.g., 16 CCE aggregation) not supported in LTE Rel-8.

A UE is expected to receive cross-carrier PDCCH messages in a particular CC when the following conditions are satisfied: The UE is configured by the eNodeB to monitor the control region of that particular CC for PDCCH messages whose DCI information includes a CIF field (i.e., the UE is configured for cross-carrier scheduling on that particular CC); and the UE is informed by the eNodeB that one or more of the other CCs for which cross-carrier PDSCH/PUSCH data can be scheduled are activated. According to one embodiment, the UE monitors a larger search space in the control region of that particular CC when both the above conditions are satisfied. When the other CCs (i.e., CCs for which PDSCH is cross-scheduled) are not activated or, after the other CCs are deactivated, UE monitors only a smaller search space in the control region of that particular CC resulting in reduced UE decoding overhead. Further, since the UE attempts fewer decode operations while monitoring the smaller search space, the probability that the UE will falsely detect a PDCCH message not signaled to it is reduced.

Figure 3:
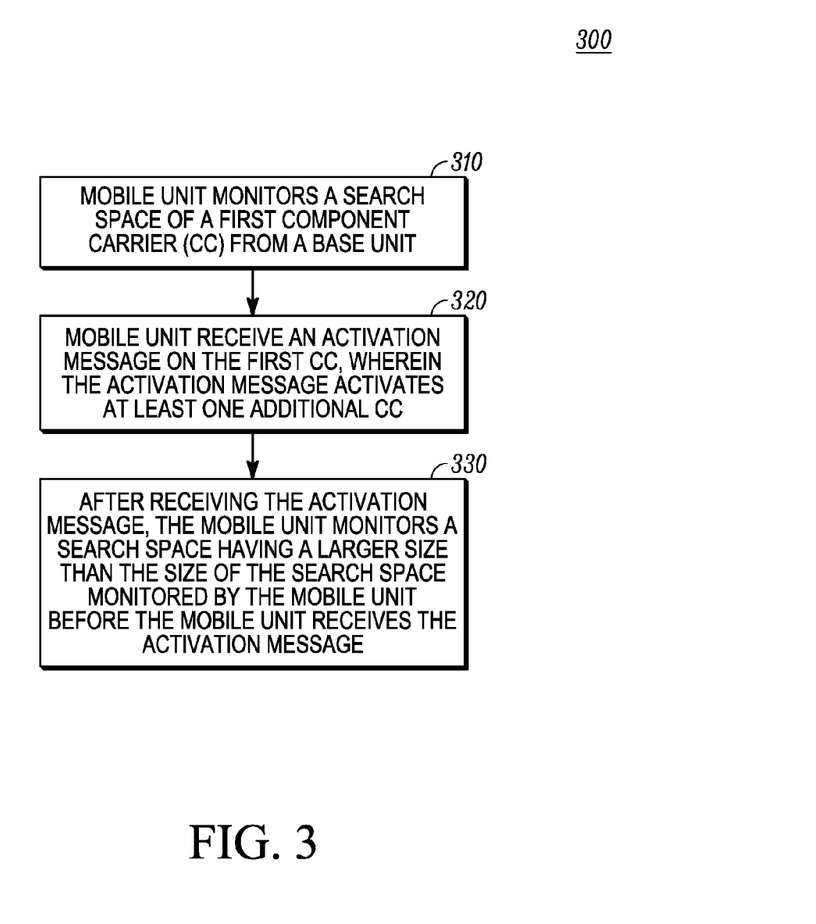
FIG. 3 is a process flow diagram.

In the process 300 of FIG. 3, at 310, a mobile unit or UE monitors a search space of a first Component Carrier (CC) from a base unit. As described above, the search space is specific to the UE and it corresponds to a set of Physical Downlink Control CHannel (PDCCH) candidates monitored by the UE for PDCCH messages. At 320, the mobile unit receives an activation message on the first CC, wherein the activation message activates at least one additional CC. At 330, after receiving the activation message, the mobile unit monitors a search space having a larger size than the size of the search space monitored by the mobile unit before the mobile unit receives the activation message.

Figure 4:
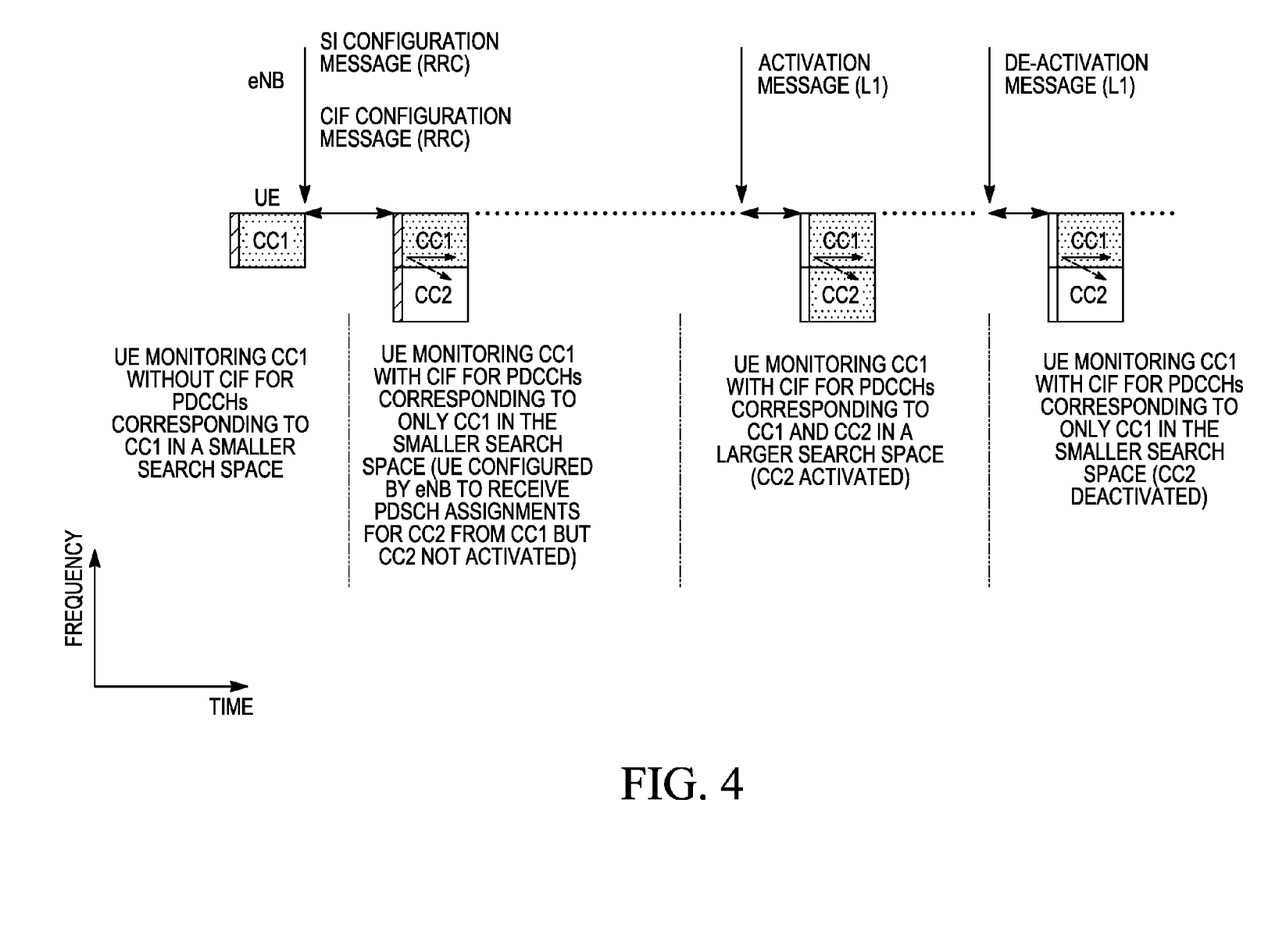
FIG. 4 illustrates a process enabling a UE to communicate on multiple component carriers with reduced complexity.

In FIG. 4, the UE initially communicates with the network or eNodeB using only a single CC (CC1) by monitoring CC1 for PDCCH messages corresponding to CC1 without a CIF. Since the PDCCH messages are expected for a single CC (CC1) UE monitors a smaller UE specific search space at each aggregation level (e.g., {6,6,2,2}*2=32 decodes similar to LTE Rel-8). Upon reception of a Radio Resource control (RRC) configuration message and a cross scheduling configuration (CSC) message (both can be combined in a single message), UE stores system information for CC2 and monitors the control region of CC1 for PDCCHs with CIF. The mobile unit receives the SI for the at least one additional CC in the radio resource control (RRC) configuration message before receiving the activation message. As described before, the first CC and the additional CC constitute a configured CC set of the UE. However, if CC2 is not activated, the UE still looks for PDCCH messages corresponding to only CC1. Since the PDCCH messages are still expected for only a single CC (CC1), the UE still monitors the smaller UE specific search space at each aggregation level. The CSC message indicates that the UE is expected to receive the PDCCH messages including a carrier indicator field (CIF), the CIF signals whether each received PDCCH message corresponds to the first CC or the at least one additional CC.

In FIG. 4, later, upon reception of an activation message activating CC2, the UE monitors the control region of CC1 for PDCCHs corresponding to CC1 and CC2 with CIF. The activation message may be received by the mobile unit in a control region of a subframe of the first CC on a PDCCH. Alternatively, the activation message may be received by the mobile unit in a higher layer message from the eNodeB such as Medium Access Control (MAC) layer message. In another embodiment, the activation message may be part of a PDCCH scheduling message, such as a PDSCH assignment or a PUSCH grant PDCCH message on the first CC or CC1. For example, a one bit activation field can be included in the PDCCH message indicating one of activation (e.g., an activation field bit value of 1) and de-activation (e.g., an activation field bit value of 0). Alternatively, the activation message may be indicated by a particular bit combination of one or more bits in the PDCCH message. Since CC2 is activated, UE looks for PDCCH messages corresponding to both CC1 and CC2. The UE may start looking for the PDCCH message corresponding to both CC1 and CC2 "x" time units after reception of the activation message. In one embodiment, "x" corresponds to an integer number of subframes after the subframe on which the activation message is received. In another embodiment, "x" may correspond to a predetermined timer value. The value of "x" may be fixed, signaled in the SI configuration message, RRC-configuration message, CSC message, activation message or a high-layer configuration message, or may be a function of the UE capability. Since the PDCCH messages are now expected for multiple CCs (CC1 and CC2), the UE monitors a larger UE specific search space at each aggregation level to provide more scheduling flexibility for the eNodeB. Alternatively, the UE can monitor a larger UE specific search space at some aggregation levels and continue monitoring a smaller UE specific search space at some other aggregation levels. Thus the size of the search space monitored by the UE after receiving the activation message and the CSC message is greater than the size of the search space monitored by the UE before receiving the activation message.

When CC2 is later deactivated, the UE reverts back to receiving PDCCHs in the smaller search space at some or all the aggregation levels. Thus after de-activating at least one additional CC, the size of the search space monitored by the UE on a first CC after de-activating the at least one additional CC is smaller than the size of the search space monitored by the UE before de-activating the at least one additional CC. The UE can de-activate CC2 after receiving a de-activation message from the eNodeB. As described above, the deactivation message can be implicit or explicit. The de-activation message may be received by the UE in a control region of a subframe of the first CC on a PDCCH. Alternatively, the de-activation message may be received by the UE in a higher layer message from the eNodeB such as Medium Access Control (MAC) layer message. In one embodiment, the de-activation message may be part of a PDCCH scheduling message, such as a PDSCH assignment or a PUSCH grant PDCCH message preferably on the first CC. For example, as mentioned above, using a one bit activation field (e.g., an activation field bit value of 0), a particular bit combination of one or more bits in the PDCCH message etc. In yet another implementation, UE can de-activate CC2 after a predetermined timer reaches a predetermined value (e.g., TIMEOUT). In a more particular implementation, the predetermined timer can count the time elapsed (e.g., number of sub frames elapsed) since the reception of a subframe where a PDCCH message scheduling a resource assignment corresponding to CC2 or the at least one additional CC was received. The predetermined value or TIMEOUT parameter value may be fixed, signaled in the SI configuration message, RRC-configuration message, CSC message, activation message or a high-layer configuration message. In these embodiments, the UE can thus de-activate the at least one additional CC or CC2 without a subsequent reception of a de-activation message from the base unit. The persistence of activation of CC2 or the at least one additional CC may be indicated by indicating a period of time or TIMEOUT measured from the last successfully decoded PDCCH indicating resources scheduled on CC2 (at least one additional CC).

In one embodiment a mobile unit receives an activation message on a first CC activating a particular set of additional CCs. After receiving the activation message, the mobile unit monitors a search space having a larger size than the size of the search space monitored by the mobile unit before the mobile unit receives the activation message. Later, the mobile unit de-activates the particular set of CCs that were activated by the activation message. The size of the search space monitored by the mobile unit after de-activating the particular set of CCs is same as the size of the search space monitored by the mobile unit before activating the particular set of CCs.

In some embodiments, the CSC message and the configuration message providing the UE with SI for the at least one additional CC can be combined into a single RRC configuration message. In such embodiments, the combined RRC configuration message indicates that the mobile unit is expected to receive the PDCCH messages including a carrier indicator field (CIF), the CIF signals whether each received PDCCH message corresponds to the first CC or the at least one additional CC.

In one embodiment, the mobile unit receives a particular PDCCH message in a monitored search space on a first CC, wherein the CIF in the particular PDCCH message indicates that a Physical Downlink Shared CHannel (PDSCH) data assignment in the particular PDCCH message corresponds to at least one additional CC. The UE then receives PDSCH data assignment on the at least one additional CC. In another embodiment, the mobile unit receives a PDCCH message in a monitored search space on a first CC, wherein the received PDCCH message schedules a Physical Uplink Shared CHannel (PUSCH) data assignment for the at least one additional CC. The UE then transmits the PUSCH data assignment on the at least one additional CC.

In some cases, the UE monitors a search space of a first Component Carrier (CC). Upon receiving an activation message activating a second CC, the UE also monitors a second search space on the second CC. The first and second search spaces are specific to the UE and each search space corresponds to a set of Physical Downlink Control CHannel (PDCCH) candidates monitored by the UE for PDCCH messages. The UE receives a cross scheduling configuration (CSC) message on the first (CC) wherein the size of the first search space monitored by the UE after receiving the CSC message is different than the size of the search space monitored by the UE before receiving the activation message and the CSC message and the second search space is no longer monitored by the UE.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication User Equipment (UE), the method comprising:
   receiving a configuration message on a first Component Carrier (CC), the first CC transmitted from a base unit, the configuration message providing system information for at least one additional CC;
   after receiving the configuration message, receiving an activation message on the first CC, the activation message activating the at least one additional CC;
   receiving a cross scheduling configuration (CSC) message on the first component carrier (CC);
   wherein the CSC message indicates that the UE is expected to receive the PDCCH messages including a carrier indicator field (CIF) on the first CC, the CIF signaling whether each received PDCCH message corresponds to the first CC or the at least one additional CC;
   monitoring a search space with the first size, on the first CC, after receiving the configuration message and the CSC message, the search space with the first size specific to the UE, the search space with the first size corresponding to a set of PDCCH candidates monitored by the UE for control information;
   monitoring a search space with the second size, on the first CC, after receiving the configuration message, CSC message, and the activation message, the search space with the second size specific to the UE, the search space with the second size corresponding to a set of PDCCH candidates monitored by the UE for control information; and
   wherein the second size is greater than the first size.

2. The method of claim 1 further comprising receiving the activation message in a control region of a subframe of the first CC on a PDCCH.

3. The method claim 1 further comprising receiving a particular PDCCH message in the monitored search space with the second size, wherein the CIF in the particular PDCCH message indicates that a Physical Downlink Shared CHannel data assignment in the particular PDCCH message corresponds to the at least one additional CC.

4. The method claim 1 further comprising receiving a particular PDCCH message in the monitored search space with the second size, wherein the particular PDCCH message schedules a Physical Downlink Shared CHannel data assignment for the at least one additional CC.

5. The method claim 1 further comprising receiving a particular PDCCH message in the monitored search space with the second size, wherein the particular PDCCH message schedules a Physical Uplink Shared CHannel data assignment for the at least one additional CC.

6. The method claim 1 further comprising receiving system information for the at least one additional CC in a radio resource control (RRC) configuration message on the first CC before receiving the activation message, wherein the first CC and the additional CC constitute a configured CC set of the UE.

7. The method claim 6 wherein the RRC configuration message indicates that the UE is expected to receive the PDCCH messages including a carrier indicator field (CIF) on the first CC, the CIF signaling whether each received PDCCH message corresponds to the first CC or the at least one additional CC.

8. The method of claim 1 wherein the search space is characterized by an aggregation level, wherein each PDCCH candidate comprises a number of logically consecutive Control Channel Elements (CCEs) in a control region of a subframe in the first CC, and wherein the aggregation level corresponds to the number of logically consecutive CCEs.

9. The method of claim 1 further comprising:
de-activating the at least one additional CC; and
monitoring a search space with a third size, on the first CC, after de-activating the at least one additional CC, the search space with the third size specific to the UE, the search space with the third size corresponding to a set of PDCCH candidates monitored by the UE for control information;
wherein the third size is smaller than the second size.

10. The method of claim 1 further comprising:
de-activating the at least one additional CC;
monitoring a search space with the first size, on the first CC, after de-activating the at least one additional CC, the search space with the first size specific to the UE, the search space with the third size corresponding to a set of PDCCH candidates monitored by the UE for control information.

* * * * *